United States Patent
Kim et al.

(10) Patent No.: US 12,169,910 B2
(45) Date of Patent: *Dec. 17, 2024

(54) IMAGE PROCESSING METHOD AND IMAGE PROCESSING APPARATUS

(71) Applicant: Samsung Electronics Co., Ltd., Suwon-si (KR)

(72) Inventors: Jihye Kim, Anyang-si (KR); Seon Min Rhee, Seoul (KR); Jongseok Kim, Seoul (KR); Heewon Kim, Seoul (KR); Seungju Han, Seoul (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/380,281

(22) Filed: Oct. 16, 2023

(65) Prior Publication Data

US 2024/0037703 A1 Feb. 1, 2024

Related U.S. Application Data

(63) Continuation of application No. 17/356,801, filed on Jun. 24, 2021, now Pat. No. 11,823,351.

(30) Foreign Application Priority Data

Dec. 15, 2020 (KR) ........................ 10-2020-0175575

(51) Int. Cl.
*G06T 5/00* (2024.01)
*G06T 5/50* (2006.01)
*G06V 10/40* (2022.01)

(52) U.S. Cl.
CPC ................. *G06T 5/00* (2013.01); *G06T 5/50* (2013.01); *G06V 10/40* (2022.01);
(Continued)

(58) Field of Classification Search
CPC ... G06T 5/00; G06T 5/50; G06T 2207/10028; G06T 2207/10048; G06T 2207/20081; G06T 2207/20084; G06V 10/40
See application file for complete search history.

(56) References Cited

U.S. PATENT DOCUMENTS 9,704,054 B1 7/2017 Tappen et al.
10,460,208 B1 10/2019 Atsmon et al.
(Continued)

FOREIGN PATENT DOCUMENTS

KR 10-2010-0050838 A 5/2010
KR 10-2010-0085675 A 7/2010
(Continued)

OTHER PUBLICATIONS

Li, Yijun, et al., "Deep Joint Image Filtering," *European Conference on Computer Vision. Springer, Cham*, 2016 (pp. 1-16).
(Continued)

*Primary Examiner* — Gregory M Desire
(74) *Attorney, Agent, or Firm* — NSIP Law

(57) ABSTRACT

An image processing method includes receiving an input image and a guide image corresponding to the input image, extracting informative features from the input image and the guide image to enhance the input image, selectively obtaining a first feature for the input image from among the informative features, and processing the input image based on the first feature.

20 Claims, 6 Drawing Sheets

(52) U.S. Cl.
CPC .............. *G06T 2207/10028* (2013.01); *G06T 2207/10048* (2013.01); *G06T 2207/20081* (2013.01); *G06T 2207/20084* (2013.01)

(56) References Cited

U.S. PATENT DOCUMENTS

| | | | | |
|---|---|---|---|---|
| 10,496,884 | B1* | 12/2019 | Nguyen | G06V 30/1916 |
| 10,936,861 | B2 | 3/2021 | Zheng et al. | |
| 11,064,230 | B2 | 7/2021 | Nielsen et al. | |
| 11,106,898 | B2 | 8/2021 | DeCovnick et al. | |
| 11,195,048 | B2* | 12/2021 | Bui | G06F 18/22 |
| 11,238,270 | B2 | 2/2022 | Xiao et al. | |
| 11,328,535 | B1* | 5/2022 | Guo | G06V 20/647 |
| 11,354,772 | B2* | 6/2022 | Bongio Karrman | G06T 3/14 |
| 11,361,456 | B2 | 6/2022 | Wang et al. | |
| 11,429,842 | B2 | 8/2022 | Wang et al. | |
| 11,580,691 | B2* | 2/2023 | Marin | H04N 13/254 |
| 11,696,039 | B2 | 7/2023 | Yang et al. | |
| 11,826,636 | B2* | 11/2023 | Argiro | A63F 13/285 |
| 11,869,272 | B2* | 1/2024 | Kwak | G06V 40/161 |
| 2017/0190223 | A1 | 7/2017 | Fish et al. | |
| 2018/0157892 | A1 | 6/2018 | Han et al. | |
| 2019/0206054 | A1 | 7/2019 | Mao et al. | |
| 2019/0295282 | A1 | 9/2019 | Smolyanskiy et al. | |
| 2019/0356905 | A1 | 11/2019 | Godard et al. | |
| 2020/0027198 | A1 | 1/2020 | Vogels et al. | |
| 2021/0118123 | A1 | 4/2021 | Fang et al. | |

FOREIGN PATENT DOCUMENTS

| | | |
|---|---|---|
| KR | 10-2019-0040746 A | 4/2019 |
| KR | 10-2019-0066428 A | 6/2019 |
| KR | 10-2019-0086320 A | 7/2019 |
| KR | 10-2019-0117354 A | 10/2019 |
| KR | 10-2020-0048032 A | 5/2020 |

OTHER PUBLICATIONS

Li, Yijun, et al., "Joint Image Filtering with Deep Convolutional Networks", *IEEE Transactions on Pattern Analysis and Machine Intelligence*, vol. 41, Issue 8, Jan. 2, 2019 (pp. 1-14).

\* cited by examiner

IMAGE PROCESSING METHOD AND IMAGE PROCESSING APPARATUS

CROSS-REFERENCE TO RELATED APPLICATIONS

This application is a continuation of U.S. application Ser. No. 17/356,801 filed on Jun. 24, 2021, which claims the benefit under 35 USC § 119(a) of Korean Patent Application No. 10-2020-0175575 filed on Dec. 15, 2020, in the Korean Intellectual Property Office, the entire disclosure of which is incorporated herein by reference for all purposes.

BACKGROUND

Field

The following description relates to an image processing method and an image processing apparatus.

2. Description of Related Art

In image recognition or scene understanding, the use of three-dimensional information is useful. The spatial distribution of an object may be predicted by adding depth information to two-dimensional spatial information. The depth information may be obtained, for example, from a depth image captured through a depth camera. However, if a depth image is not captured, the spatial distribution of an object may not be directly obtained. Even when it is possible to obtain depth information, the quality and amount of depth information obtainable from a depth image may vary depending on the specification of a depth camera.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image processing method, including receiving an input image and a guide image corresponding to the input image, extracting informative features from the input image and the guide image to enhance the input image, selectively obtaining a first feature for the input image from among the informative features, and processing the input image based on the first feature.

The input image may include a depth image, and the guide image may include an infrared (IR) image.

The extracting of the informative features may include at least one of determining the informative features from the input image and the guide image by supervised learning, or determining the informative features from the input image and the guide image by unsupervised learning.

The extracting may include estimating a portion of the informative features by the supervised learning, and estimating a remaining portion of the informative features, other than the portion, by the unsupervised learning.

The informative features may include any one or any combination of an edge of the input image, an edge of the guide image, a gradient of the input image, a gradient of the guide image, a first surface normal map having a magnitude of each direction vector of a surface normal estimated from the input image as an intensity, an image having an angle of a normal estimated from the input image as an intensity, a depth intensity estimated from the input image, a second surface normal map having a magnitude of each direction vector of a surface normal estimated from the guide image as an intensity, an image having an angle of a normal estimated from the guide image as an intensity, and a segmentation map corresponding to the guide image.

The selectively obtaining of the first feature may include selectively obtaining the first feature from among the informative features using an attention network.

The selectively obtaining of the first feature may include selectively obtaining the first feature for at least one of a space or a channel of the input image from among the informative features using the attention network.

The selectively obtaining of the first feature may include selectively obtaining the first feature for each channel of the input image from among the informative features by applying the informative features to a first attention network that uses channel attention.

The image processing method may include extracting image features from the input image, and selectively obtaining a second feature for the input image from among the image features, wherein the processing of the input image may include processing the input image based on the first feature and the second feature.

The processing of the input image may include processing on the input image by aggregating the first feature and the second feature.

The selectively obtaining of the second feature may include selectively obtaining the second feature for each region of the input image by applying the image features to a second attention network that uses spatial attention.

The guide image may include a position of an object in the guide image is same as the position of the object in the input image.

The guide image may include any one or any combination of features a normal direction of a surface of the object, a direction of light incident to the object, and a distance to the object.

In another general aspect, there is provided an image processing apparatus, including a communication interface configured to receive an input image and a guide image corresponding to the input image, and a processor configured to extract informative features from the input image and the guide image to enhance the input image, to selectively obtain a first feature for the input image from among the informative features, and to process the input image based on the first feature.

The processor may be configured to perform at least one of determine the informative features from the input image and the guide image by supervised learning, or to determine the informative features from the input image and the guide image by unsupervised learning.

The processor may be configured to estimate a portion of the informative features by the supervised learning, and to estimate a remaining portion of the informative features, other than the portion, by the unsupervised learning.

The informative features may include any one or any combination of an edge of the input image, an edge of the guide image, a gradient of the input image, a gradient of the guide image, a first surface normal map having a magnitude of each direction vector of a surface normal estimated from the input image as an intensity, an image having an angle of a normal estimated from the input image as an intensity, a depth intensity estimated from the input image, a second surface normal map having a magnitude of each direction vector of a surface normal estimated from the guide image as an intensity, an image having an angle of a normal estimated from the guide image as an intensity, and a segmentation map corresponding to the guide image.

The processor may be configured to selectively obtain the first feature for at least one of a space or a channel of the input image from among the informative features using the attention network.

The processor may be configured to selectively obtain the first feature for each channel of the input image from among the informative features by applying the informative features to a first attention network that uses channel attention.

The processor may be configured to extract image features from the input image, to selectively obtain a second feature for the input image from among the image features, and to process the input image by aggregating the first feature and the second feature.

The processor may be configured to selectively obtain the second feature for each region of the input image by applying the image features to a second attention network that uses spatial attention.

In another general aspect, there is provided an image processing method, including receiving an input image and a guide image corresponding to the input image, extracting informative features from the input image and the guide image, selectively obtaining a first feature for the input image from among the informative features using a first attention network that uses channel attention, selectively obtaining a second feature for the input image from among the informative features using a second attention network that uses spatial attention, and processing the input image based on the first feature and the second feature.

The image processing method may include denoising the input image, and the extracting of the informative features may include extracting the informative features from the denoised input image and the guide image.

The image processing method may include weighing the input image based on the second feature, and the extracting of the informative features may include extracting the informative features from the weighted input image and the guide image.

Other features and aspects will be apparent from the following detailed description, the drawings, and the claims.

Figure 1:
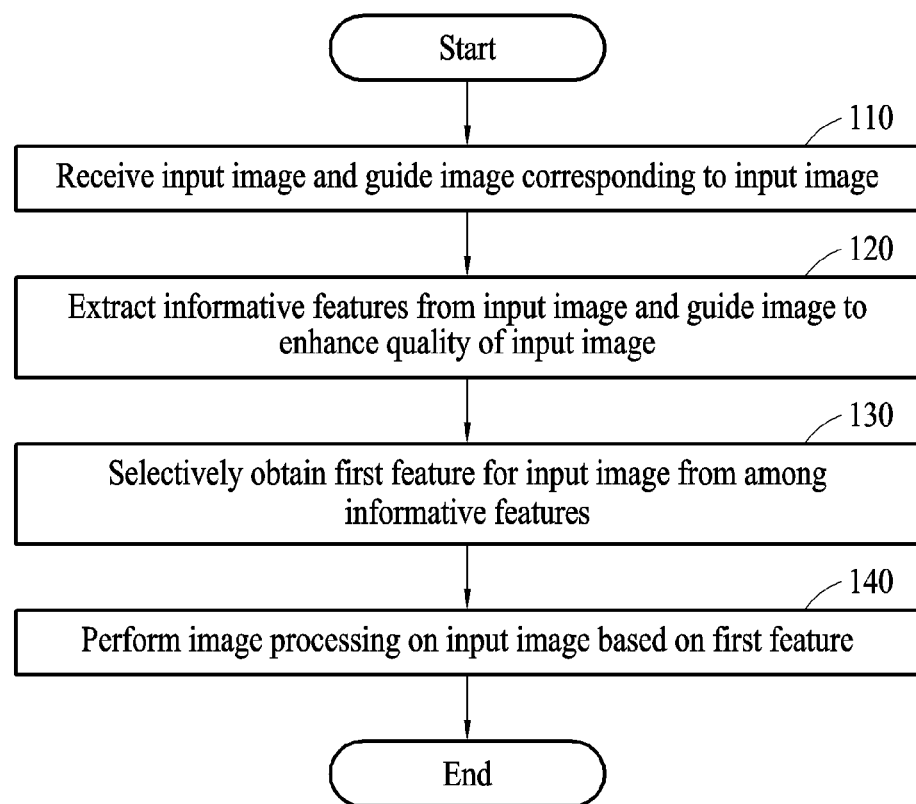
FIG. 1 illustrates an example of an image processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms of first, second, A, B, (a), (b), may be used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 is a diagram illustrating an image processing method according to an example embodiment. The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer, such as a processor, that perform the specified functions, or combinations of special purpose hardware and computer instructions. In an example, the process of enhancing the quality of an input image may be performed by an image processing apparatus through operations 110 to 140.

In operation 110, the image processing apparatus receives an input image and a guide image corresponding to the input image. The input image may include, for example, a depth image. In this example, the depth image may be captured by a depth camera or a stereo camera. In an example, the guide image may include, for example, an infrared (IR) image. In this example, the guide image may be an IR image or IR intensity image sensed by a time of flight (ToF) camera sensor. In an example, the guide image corresponding to the input image may be a guide image acquired by capturing the same object at the same position as in the input image. Features of the guide image will be described in detail with reference to FIG. 2.

In operation 120, the image processing apparatus extracts informative features from the input image and the guide image to enhance the quality of the input image. Here, the "informative features" may also be referred to as "informative information". In an example, the image processing apparatus may estimate the informative features from the input image and the guide image by supervised learning. The image processing apparatus may extract features with richer information from the guide image by a neural network trained by supervised learning. In another example, the image processing apparatus may use a neural network trained by supervised learning to set and estimate the informative features such that the extracted features include significant information. In another example, the image processing apparatus may estimate the informative features from the input image and the guide image by unsupervised learning. In unsupervised learning, priory information on what information should be extracted from the input or guide images is not provided. Therefore, the neural network may extract the information on its own based on a final loss function. In another examples, the image processing apparatus may extract the informative features by mixing supervised learning and unsupervised learning. For example, if the number of extracted information features is N, the image processing apparatus may estimate a portion (a) of the N informative features by supervised learning, and estimate the remaining portion (N−a) by unsupervised learning.

In an example, the informative features may correspond to various types of features that are extracted and/or estimated from each of the input image and the guide image. In another example, the informative features may correspond to various types of features that are extracted and/or estimated by aggregating the input image and the guide image. The informative features may include many different types of features, such as, for example, any one or any combination of an edge of the input image, an edge of the guide image, x- and y-axial gradients of the input image, x- and y-axial gradients of the guide image, a surface normal map having a magnitude of each direction vector of a surface normal estimated from the input image as an intensity, an image having an angle of a normal estimated from the input image as an intensity, a depth intensity estimated from the input image, a surface normal map having a magnitude of each direction vector of a surface normal estimated from the guide image as an intensity, an image having an angle of a normal estimated from the guide image as an intensity, and a segmentation map corresponding to the guide image. In an example, the depth intensity may be estimated from the input image in the intermediate process of extracting a depth intensity from the input image through the neural network. The surface normal map may correspond to a map storing the value of a normal vector to the surface of the object. In an example the surface normal map may be, for example, an angular image or a vector magnitude image. In operation 120 various types of features that are obtainable from the input image and the guide image may be extracted.

In operation 130, the image processing apparatus selectively obtains a first feature for the input image from among the extracted informative features. The feature for the input image is a feature that is available in the input image or is applicable to the input image. Hereinafter, the "first feature" may be construed as a feature that is selected from among the informative features extracted from the input image and the guide image.

In an example, the image processing apparatus may selectively obtain the first feature for the input image from among the informative features using an attention network. The image processing apparatus may selectively obtain the first feature for at least one of a space and a channel of the input image from among the informative features by applying the informative features to the attention network. The image processing apparatus may select a desired feature (for example, a feature applicable to the space and/or the channel of the input image) from among the informative features using the attention network. The image processing apparatus may select the desired feature through the attention network, thereby preventing the copying of inappropriate texture from an IR image to a depth image while maximizing the transfer of a primary component or feature to the depth image.

In an example, the "attention network" may allow a deep learning model to attend to feature vectors, thereby improving the network performance. For example, the attention network may be configured in an encoder-decoder structure including an encoder to generate a vector from an input such as informative features and a decoder to output informative features to a region of an input image corresponding to a desired result from the vector output by the encoder. However, examples are not necessarily limited thereto.

In an example, the image processing apparatus may selectively obtain the first feature for each channel of the input image from among the informative features by applying the extracted informative features to a first attention network that uses channel attention.

In another example, in operation 130, the image processing apparatus may extract image features from the input image. The image processing apparatus may extract the image features from the input image, for example, by a convolutional neural network (CNN) 450 of FIG. 4. In another example, when the input image is a noisy depth image, the image processing apparatus may denoise the input image, for example, through a denoiser 550 of FIG. 5, and extract the image features from the denoised image.

The image processing apparatus may selectively obtain a second feature for the input image from among the image features. For example, the image processing apparatus may selectively obtain the second feature for each region of the input image by applying the image features to a second attention network that uses spatial attention. Hereinafter, the "second feature" may be construed as a feature selected from among the features extracted from the input image to enhance the quality of the input image.

In operation 140, the image processing apparatus performs image processing on the input image based on the obtained first feature. For example, when the second feature is selectively obtained in addition to the first feature in operation 130, the image processing apparatus may perform the image processing on the input image based on the first feature and the second feature. For example, the image processing apparatus may perform the image processing on the input image by aggregating the first feature and the second feature. Here, the "image processing on the input image" may correspond to, for example, image processing that enhances the image quality by adding information to the input image.

Figure 2:
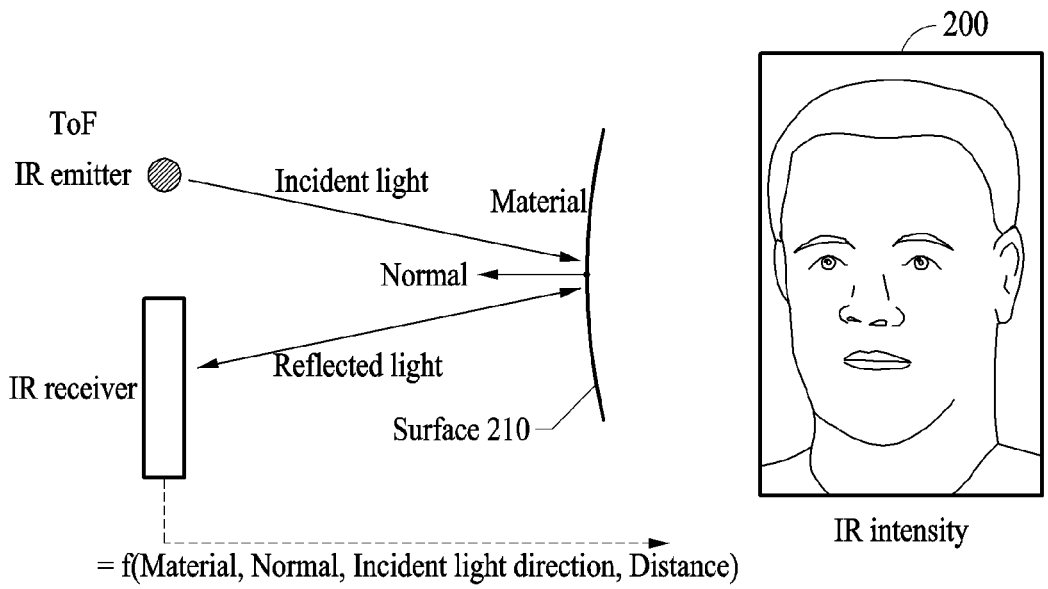
FIG. 2 illustrates an example of features of a guide image.

FIG. 2 illustrates an example of features of a guide image. Referring to FIG. 2, features obtainable from a guide image obtained using a time of flight (ToF) camera sensor are illustrated.

A guide image may be, for example, an IR image or IR intensity image sensed by a ToF camera sensor. The ToF camera sensor may operate in a manner that emits incident light (IR wavelength) toward the surface 210 of an object 200 through an IR emitter such as, for example, an IR light source or a floodlight sensor, and calculates the distance to the object 200 by measuring a time of flight taken for an IR receiver to receive reflected light that is reflected from the surface 210 of the object 200 and returns. Since the ToF camera sensor scans the object 200 by emitting IR rays toward the object 200, the guide image obtained through the ToF camera sensor may obtain three-dimensional (3D) scan information about the object 200.

In addition, the guide image may include features such as a material characteristic including color and reflectance, the normal direction of the surface 210 of the object 200, the direction of light incident to the object 200, and the distance to the object 200.

Figure 3:
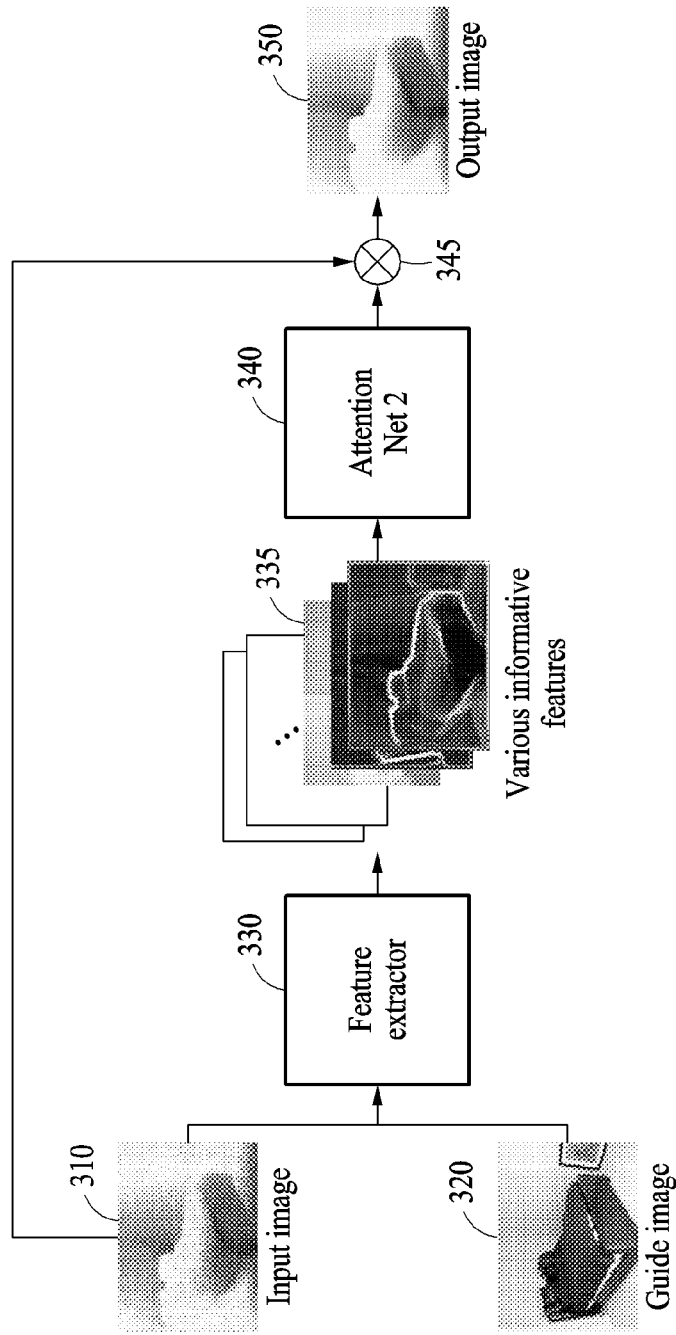
FIGS. 3 to 6 illustrate examples of a configuration and operations of an image processing apparatus.

FIG. 3 illustrates an example of a configuration and operations of an image processing apparatus. Referring to FIG. 3, an image processing apparatus may extract informative features 335 from an input image 310 and a guide image 320 to enhance the quality of the input image 310. The input image 310 may be, for example, a noisy depth image. In addition, the guide image 320 may be, for example, a single IR image obtained through a ToF camera sensor as shown in FIG. 2. One or more blocks of FIG. 3, such as feature extractor 330, encoder, and combinations of the blocks, can be implemented by special purpose hardware-based computer, such as a processor, that perform the specified functions, or combinations of special purpose hardware and computer instructions.

The image processing apparatus may extract the informative features 335 from the input image 310 and/or the guide image 320 by a neural network that is trained by supervised learning, such as, for example, a feature extractor 330 or an encoder. In this example, the feature extractor 330 may extract the informative features 335 to enhance the quality of the input image 310 by guiding information obtainable from the input image 310 and/or the guide image 320 by explicit supervision.

The image processing apparatus may selectively obtain a first feature for the input image 310 from among the informative features 335 using an attention network 340. The image processing apparatus may generate an output image 350 with enhanced resolution or depth information compared to the input image 310 by aggregating the first feature and the input image 310, in operation 345.

In an example, the image processing apparatus may reconstruct the input image 310 while preserving the main features of a face by learning the guide image 320 along with the input image 310 through deep learning.

Figure 4:
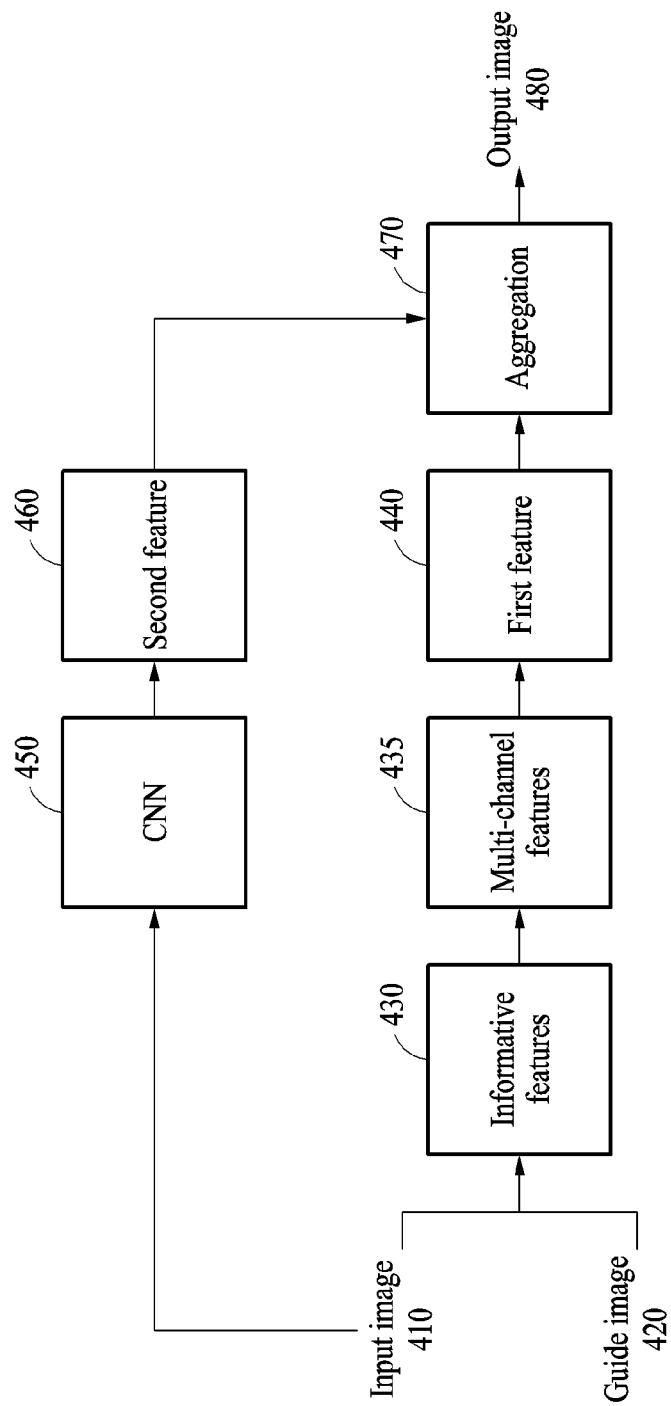

FIG. 4 illustrates an example of a configuration and operations of an image processing apparatus. FIG. 4 illustrates an example of a structure in which an image processing apparatus obtains enhanced depth information by enhancing an input image 410, which is a noisy depth image, with a guide image 420, which is a single IR image.

The image processing apparatus may extract informative features 430 from the input image 410 and the guide image 420. The informative features 430 may correspond to various types of features, as described above. The informative features 430 may be edges and/or gradients of the input image 410 and/or the guide image 420. In another example, the informative features 430 may be another type of image that is estimable from input image 410 and/or the guide image 420. For example, the informative features 430 may be a type of image having a magnitude of each direction vector of the surface normal of the input image 410 and/or the guide image 420 as an intensity, or a type of image having an angle of the normal as an intensity. In an example, the informative features 430 may be the output of the intermediate operation of estimating a depth value through a neural network or a segmentation map. The informative features 430 may be estimated through supervised learning of a neural network that extracts features. Further, the informative features 430 may include other various features extracted without separate supervised learning.

In an example, the informative features 430 may be helpful to enhance the depth of the input image 410 but may not helpful equally for all regions of the input image 410. Whether the informative features 430 are helpful to enhance the depth or resolution of the input image 410 may depend on a region (or space) of the input image 410. For example, if depth-less information of the guide image 420 is converted to a depth, the depth of a region A or a channel X of the input image 410 may cause artifacts due to the information of the guide image 420.

Therefore, the image processing apparatus may selectively obtain a feature useful to the region A of the input image 410, that is, a first feature 440, from among the informative features 430 using a first attention network. In another example, the image processing apparatus may selectively obtain a first feature 440 useful to the channel X of the input image from among multi-channel features 435 included in the informative features 430 using the first attention network. In this example, the attention direction of the attention network may be applied to, for example, the channel or space of the input image 410 in various manners.

Further, the image processing apparatus may extract image features from the input image 410 by a CNN 450, and selectively obtain a feature for the input image 410, that is, a second feature 460, from among the image features using a second attention network. The selectively obtained second feature 460 may be aggregated with the first feature 440 to form a final depth.

When a variety of information is obtained from two images, the use of all the information may cause improper transfer, such as texture copying where texture information irrelevant to depth is copied. Thus, the image processing apparatus may need to obtain different information for each region or for each channel from the two images. The image processing apparatus may select only features to be finally converted to a depth by making the extracted information or features pass through an attention network that uses spatial attention or channel attention.

The image processing apparatus may selectively obtain features to supplement inaccurate depth information of the input image 410 through the attention network, thereby preventing an error in a final output image 480.

Figure 5:
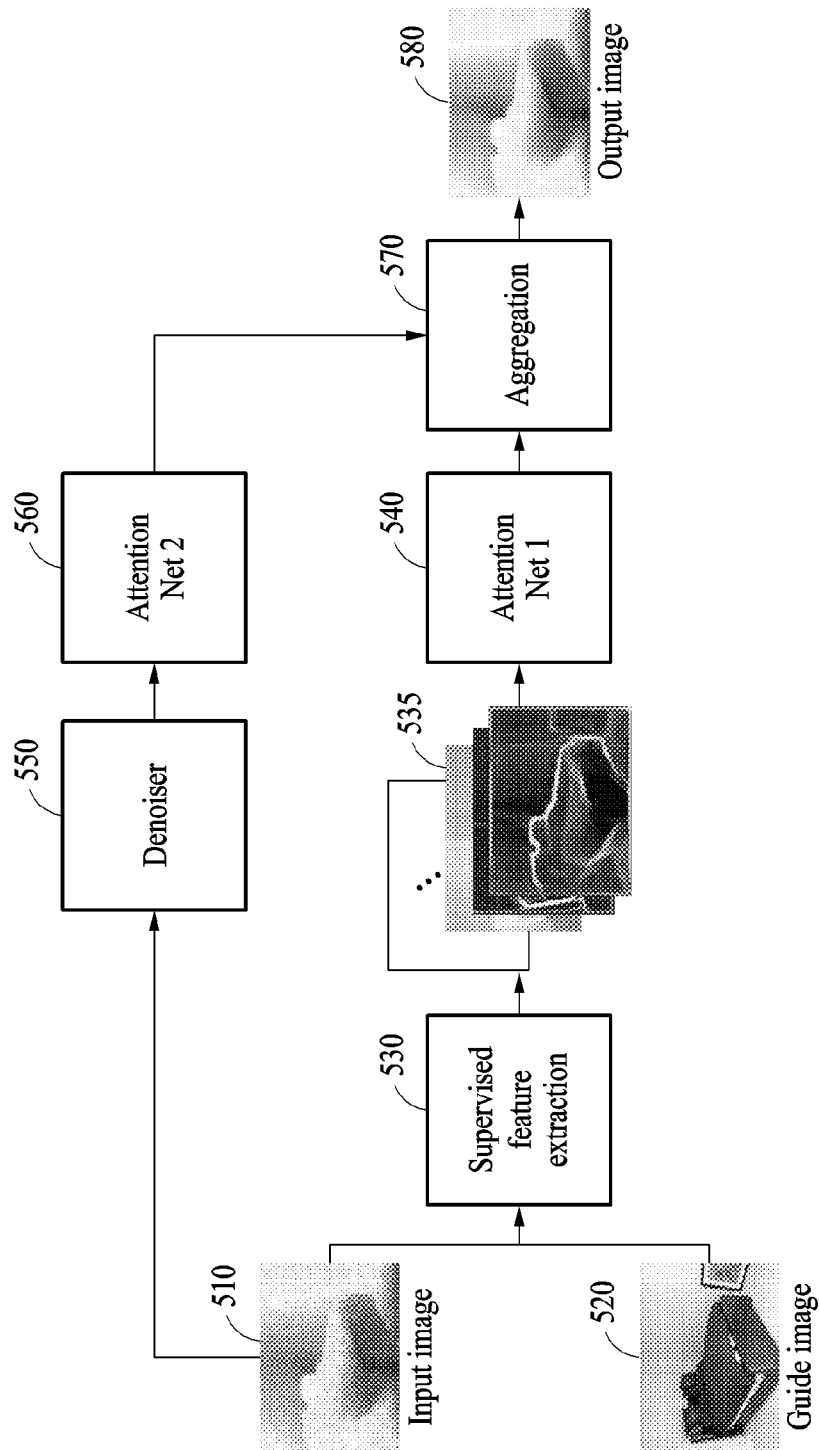

FIG. 5 illustrates an example of a configuration and operations of an image processing apparatus. Referring to FIG. 5 illustrates a structure in which an image processing apparatus obtains an output image including enhanced depth information by enhancing an input image 510, which is a noisy depth image, with a guide image 520, which is a single IR image.

In operation 530, the image processing apparatus may extract informative features 535 from the input image 510 and the guide image 520. The informative features 535 may include features described above, such as, for example, a material, a color, a reflection, a normal, an edge of the input image, an x-axial edge, a y-axial edge, and an edge of the guide image.

The image processing apparatus may selectively obtain a first feature useful to the input image 510 from among the informative features 535 using a first attention network 540. The image processing apparatus may selectively transfer desired information (for example, depth information) for each channel and/or space of the input image 510 from among the information extracted from the guide image 520, which is an IR image, through the first attention network 540, and may prevent the transfer of undesired information (for example, texture information).

In addition, the image processing apparatus may denoise the input image 510 by the denoiser 550, and selectively obtain a second feature from the denoised input image 510 using a second attention network 560.

In operation 570, the image processing apparatus may form a final depth for an output image 580 by aggregating the first feature extracted by the first attention network 540 and the second feature output from the second attention network 560.

Figure 6:
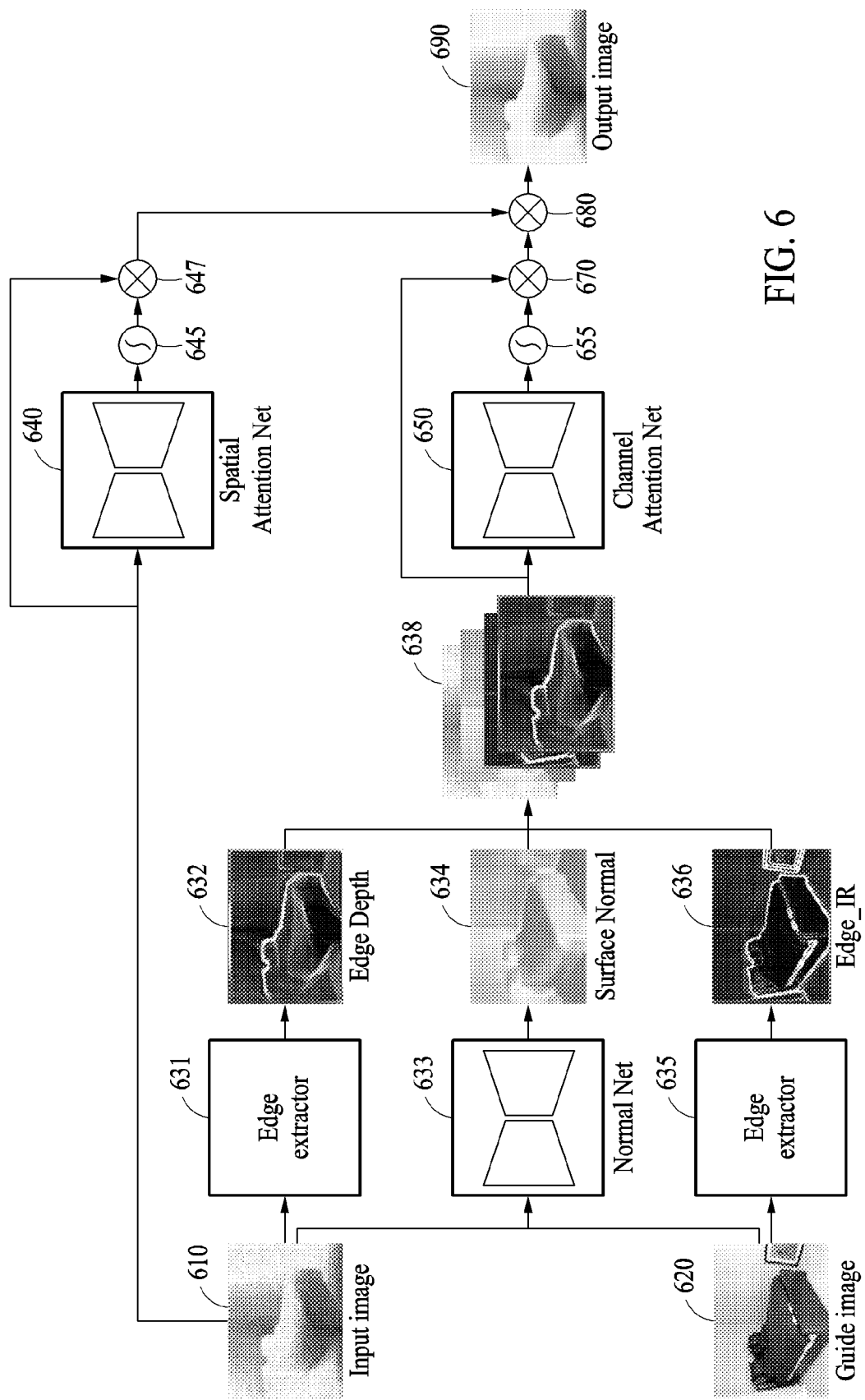

FIG. 6 illustrates an example of a configuration and operations of an image processing apparatus.

The image processing apparatus may extract a second feature by applying an input image 610 to a spatial attention network 640. The spatial attention network 640 may be, for example, a neural network having an encoder-decoder structure. However, examples are not necessarily limited thereto.

The image processing apparatus may convert the second feature to a value between 0 and 1 or a value between −1 and 1 using a sigmoid function 645. Here, the sigmoid function 645 has all real numbers as a domain, and a return value thereof may be in the range from 0 to 1 or from −1 to 1. The sigmoid function 645 may be used, for example, as an activation function for an artificial neuron in the spatial attention network 640. The second feature converted to a value between 0 and 1 (or between −1 and 1) by the sigmoid function 645 may be aggregated with the input image 610, in operation 647, and utilized as a weight.

In an example, the image processing apparatus may extract informative features 630 from the input image 610 and a guide image 620. More specifically, the image processing apparatus may extract an edge 632 from the input image 610 through an edge extractor 631. The edge 632 may correspond to the edge of a depth image. The image processing apparatus may extract an edge 636 from the guide image 620 through an edge extractor 635. The edge 636 may correspond to the edge of an IR image. In an example, the image processing apparatus may extract a surface normal map 634 from the input image 610 and the guide image 620 through a normal network 633. The normal network 633 may be a neural network that is trained in advance to extract the surface normal map 634 from the images. The normal network 633 may be, for example, a neural network having an encoder-decoder structure. However, examples are not necessarily limited thereto.

The image processing apparatus may input informative features 638 including the edge 632 of the depth image, the surface normal map 634, and the edge 636 of the IR image to a channel attention network 650. A first feature extracted through the channel attention network 650 may be converted to a value between 0 and 1 (or a value between −1 and 1) by the sigmoid function 655. The first feature converted by the sigmoid function 655 may be aggregated with the informative features 638, in operation 670, and utilized as a weight of the informative features 638 for the input image 610.

In operation 680, the image processing apparatus may generate an output image 690 by finally aggregating the result of operation 647 and the result of operation 670. The output image 690 may correspond to, for example, a depth image with enhanced image quality.

Figure 7:
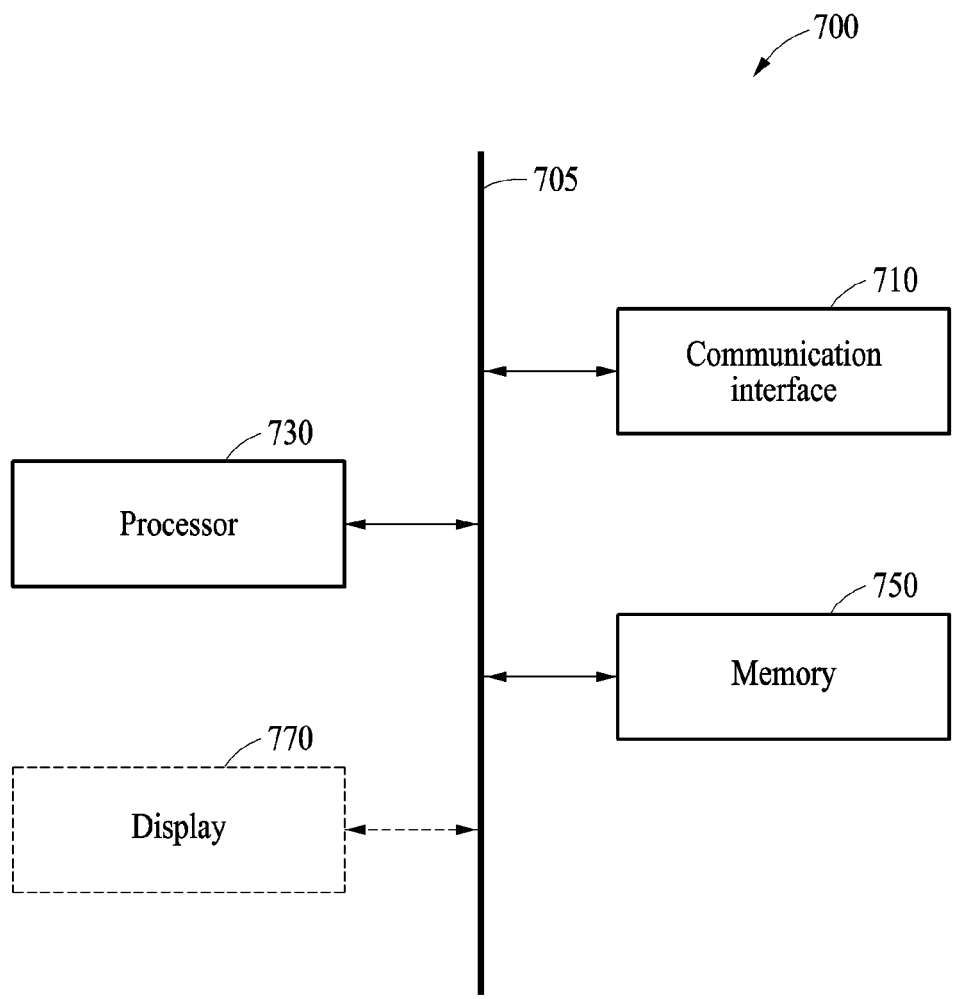
FIG. 7 illustrates an example of an image processing apparatus.

FIG. 7 illustrates an example of an image processing apparatus 700. Referring to FIG. 7, an image processing apparatus 700 includes a communication interface 710, a processor 730, and a memory 750. The image processing apparatus 700 may further include a display 770. The communication interface 710, the processor 730, the memory 750, and the display 770 may communicate with each other through a communication bus 705.

The communication interface 710 receives an input image and a guide image corresponding to the input image. The communication interface 710 may output the input image processed through image processing by the processor 730.

The processor 730 extracts informative features from the received input image and the received guide information to enhance the quality of the input image. The processor 730 selectively obtains a first feature for the input image from among the informative features. The processor 730 performs image processing on the input image based on the first feature.

In addition, the processor 730 may perform the at least one method described with reference to FIGS. 1 through 6 or an algorithm corresponding to the at least one method. The processor 730 may be an image processing device implemented by hardware including a circuit having a physical structure to perform desired operations. For example, the desired operations may include instructions or codes included in a program. For example, the hardware-implemented image processing device may include for example, a microprocessor, a central processing unit (CPU), single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, a processor core, a multi-core processor, and a multiprocessor, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner. Further description of the processor 830 is given below.

The processor 730 may execute a program and control the image processing apparatus 700. Program codes to be executed by the processor 730 may be stored in the memory 750.

The memory 750 may store the input image and/or the guide image received through the communication interface 710. The memory 750 may store the informative features extracted from the input image and the guide image by the processor 730. The memory 750 may store the first feature that is selectively obtained for the input image by the processor 730 from among the informative features. In addition, the memory 750 may store the output image corresponding to the result of performing image processing on the input image by the processor 730.

The memory 750 may store a variety of information generated in the processing process of the processor 730 described above. In addition, the memory 750 may store a variety of data and programs. The memory 750 may include a volatile memory or a non-volatile memory. The memory 750 may include a large-capacity storage medium such as a hard disk to store a variety of data.

In an example, the volatile memory device may be, for example, a dynamic random-access memory (DRAM), a static RAM (SRAM), a thyristor RAM (T-RAM), a zero-capacitor RAM (Z-RAM), or a twin-transistor RAM (TTRAM).

In an example, the nonvolatile memory device may be, for example, an electrically erasable programmable read-only memory (EEPROM), a flash memory, a magnetic RAM (MRAM), a spin-transfer torque (STT) MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory. Further description of the memory 750 is given below.

In an example, the image processing apparatus 700 may display the image processed through the processor 730 on the display 770. In an example, the display 770 is a physical structure that includes one or more hardware components that provide the ability to render a user interface, render a display, and/or receive user input.

The image processing apparatus 700 may include devices in various fields, such as, for example, an advanced driver-assistance system (ADAS), a head-up display (HUD), a 3D digital information display (DID), a navigation device, a neuromorphic device, a 3D mobile device, a smart phone, a smart TV, a smart vehicle, an Internet of Things (IoT) device, a medical device, and a measurement device. The 3D mobile device may be construed as including all display devices such as, for example, a display device for displaying augmented reality (AR), virtual reality (VR), and/or mixed reality (MR), a head-mounted display (HMD), and a face-mounted display (FMD).

The image processing apparatus, image processing apparatus 700, extractor 330, denoiser 550, edge extractor 631 and 635 and other apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the image processing method. In another example, the instructions or software include higher-level code that is executed by the processor or computer using an interpreter. The instructions or software may be written using any programming language based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image processing method, comprising:
   receiving an input image and a guide image corresponding to the input image;
   extracting informative features from the input image and the guide image to enhance the input image;
   selectively obtaining a first feature for at least one of a space or a channel of the input image from among the informative features using an attention network; and
   processing the input image based on the first feature.

2. The image processing method of claim 1, wherein the input image comprises a depth image, and the guide image comprises an infrared (IR) image.

3. The image processing method of claim 1, wherein the extracting of the informative features comprises at least one of:
   determining the informative features from the input image and the guide image by supervised learning; or
   determining the informative features from the input image and the guide image by unsupervised learning.

4. The image processing method of claim 3, wherein the extracting comprises:
   estimating a portion of the informative features by the supervised learning; and
   estimating a remaining portion of the informative features, other than the portion, by the unsupervised learning.

5. The image processing method of claim 1, wherein the informative features comprise any one or any combination of an edge of the input image, an edge of the guide image, a gradient of the input image, a gradient of the guide image, a first surface normal map having a magnitude of each direction vector of a surface normal estimated from the input image as an intensity, an image having an angle of a normal estimated from the input image as an intensity, a depth intensity estimated from the input image, a second surface normal map having a magnitude of each direction vector of a surface normal estimated from the guide image as an intensity, an image having an angle of a normal estimated from the guide image as an intensity, and a segmentation map corresponding to the guide image.

6. The image processing method of claim 1, wherein the selectively obtaining of the first feature comprises selectively obtaining the first feature from among the informative features using the attention network.

7. The image processing method of claim 1, further comprising:
   extracting image features from the input image; and
   selectively obtaining a second feature for the input image from among the image features,
   wherein the processing of the input image comprises processing the input image based on the first feature and the second feature.

8. The image processing method of claim 7, wherein the processing of the input image comprises processing on the input image by aggregating the first feature and the second feature.

9. The image processing method of claim 7, wherein the selectively obtaining of the second feature comprises selectively obtaining the second feature for each region of the input image by applying the image features to a second attention network that uses spatial attention.

10. The image processing method of claim 1, wherein the guide image comprises a position of an object in the guide image is same as the position of the object in the input image.

11. The image processing method of claim 10, wherein the guide image comprises any one or any combination of features a normal direction of a surface of the object, a direction of light incident to the object, and a distance to the object.

12. A non-transitory computer-readable storage medium storing instructions that, when executed by a processor, cause the processor to perform the image processing method of claim 1.

13. An image processing apparatus, comprising:
a communication interface configured to receive an input image and a guide image corresponding to the input image; and
a processor configured to extract informative features from the input image and the guide image to enhance the input image, to selectively obtain a first feature for at least one of a space or a channel of the input image from among the informative features using an attention network, and to process the input image based on the first feature.

14. The image processing apparatus of claim 13, wherein the processor is further configured to perform at least one of determine the informative features from the input image and the guide image by supervised learning, or to determine the informative features from the input image and the guide image by unsupervised learning.

15. The image processing apparatus of claim 14, wherein the processor is further configured to:
estimate a portion of the informative features by the supervised learning, and to estimate a remaining portion of the informative features, other than the portion, by the unsupervised learning.

16. The image processing apparatus of claim 13, wherein the informative features comprise any one or any combination of an edge of the input image, an edge of the guide image, a gradient of the input image, a gradient of the guide image, a first surface normal map having a magnitude of each direction vector of a surface normal estimated from the input image as an intensity, an image having an angle of a normal estimated from the input image as an intensity, a depth intensity estimated from the input image, a second surface normal map having a magnitude of each direction vector of a surface normal estimated from the guide image as an intensity, an image having an angle of a normal estimated from the guide image as an intensity, and a segmentation map corresponding to the guide image.

17. The image processing apparatus of claim 13, wherein the processor is further configured to extract image features from the input image, to selectively obtain a second feature for the input image from among the image features, and to process the input image by aggregating the first feature and the second feature.

18. The image processing apparatus of claim 17, wherein the processor is further configured to selectively obtain the second feature for each region of the input image by applying the image features to a second attention network that uses spatial attention.

19. The image processing apparatus of claim 13, wherein the image processing apparatus comprises at least one of a head-up display (HUD), a 3D digital information display (DID), a navigation device, a 3D mobile device, a smartphone, a smart television (TV), a smart vehicle, an Internet of things (IoT) device, a medical device, or a measurement device.

20. An image processing method, comprising:
receiving an input image and a guide image corresponding to the input image;
extracting informative features from the input image and the guide image;
selectively obtaining a first feature for at least one of a space or a channel of the input image from among the informative features using an attention network;
selectively obtaining a second feature for the input image from among the informative features using a second attention network that uses spatial attention; and
processing the input image based on the first feature and the second feature.

* * * * *